Patented Sept. 10, 1929.

1,727,719

UNITED STATES PATENT OFFICE.

GEORG KRÄNZLEIN, ARTHUR VOSS, AND FRANZ BRUNNTRÄGER, OF HOCHST-ON-THE-MAIN, GERMANY, ASSIGNORS TO GENERAL ANILINE WORKS, INC., OF NEW YORK, N. Y., A CORPORATION OF DELAWARE.

WATER-SOLUBLE MINERAL TANNING AGENT.

No Drawing. Application filed April 13, 1926, Serial No. 101,826, and in Germany April 24, 1925.

Our present invention relates to mineral tanning agents, which possess excellent solubility in water, and to processes for preparing the same.

We have found that the tanning properties of the basic chromium salts can be considerably improved by combining them with water-soluble salts of the alkaline earth metals for instance calcium or metals closely related thereto, such as salts of zinc or of magnesium, the combination being effected in such a manner that no reaction-products which are insoluble in water are formed. Thus for example, it is possible, by combining one molecule of basic chromium sulphate, $$Cr_2(SO_4)(OH)_4$$

with two molecules of magnesium sulphate, to obtain a chromium preparation which dissolves sufficiently well in water. If a product is prepared in the same molecular proportion as indicated above, in which the chromium sulphate possesses, for example, a basicity of $33\frac{1}{3}$ to 50%, then the basic chromium magnesium sulphate so obtained is easily soluble in cold water, in contrast to a chromium sulphate of the same basicity prepared without any additional components. The basicity of basic chromium compounds depends upon the number of hydroxyl groups in a molecule of the compound. Thus $Cr_4(OH)_{12}$ is usually referred to as having a basicity of 100% and $Cr_4(OH)_6Cl_6$ is 50% basic and $Cr_4(OH)_4Cl_8$ is $33\frac{1}{3}$% basic.

Besides the advantage of great solubility, the compounds of this invention possess other advantages. Although the ability to separate from the solutions in flakes is diminished, a thorough tanning is obtained considerably faster with the combination tanning salts than with the simple chromium salts of the same basicity. Consequently the yield of the chrome tanning liquors is greater, and the leathers obtained by the use of equal amounts of chromium are more plump and compact in the case of the products of the above process.

The leathers obtainable by the new combined process are distinguished by a remarkably light color and by their stability while being stored.

The process of preparing the combination tanning salts, above referred to, may be varied according to the metallic components of the tanning agent used. For instance for preparing the mixed chromium salts the process may be carried out as above stated by mixing a basic chromium salt with the second component, or by mixing the neutral chromium salt with the salt of the bivalent metal, and effecting the necessary basicity by adding a base to the aqueous solution of the two salts.

The invention is illustrated by the following examples:

(1) 412 parts by weight of 100% chromium hydroxide are mixed with 740 parts by weight of crystallized magnesium sulphate and 2,000 parts of water and 1,110 parts by weight of 1.23 specific gravity sulphuric acid are allowed to run in while stirring at 90° C. A clear solution is obtained from which the greater part of water is separated by evaporation in a vacuum. The solid product obtained, which is allowed to separate in its best form as a bright green powder by means of suitable apparatus, although it is not hygroscopic, is very easily soluble in cold water. It can be used directly for chrome tanning.

For the tanning of 100 parts of hides, enough of the product prepared in Example 1 is dissolved in three times its weight of water, so that, according to the character of the leather desired, 1.7 to 2.25 parts of chromium oxide are made use of. This tanning solution is added in three portions during the course of an hour to the 100 parts of hides, which are fulled in a tanning vat with 150 parts of water and two parts of sodium chloride. After fulling for three to four hours, a plump, soft leather of fine grain and fast to boiling is obtained.

(2) 400 parts by weight of 100% chromium hydroxide are mixed with the same amount of crystallized magnesium chloride, and 1,500 parts of water and 760 parts by weight of 1.17 sp. gr. hydrochloric acid are allowed to slowly run in at 90° C. in the manner described in Example 1. After the solution has become clear, it is evaporated and dried as described above. A bright green powder is obtained which dissolves easily in cold water without leaving any residue. The process of tanning is carried out exactly as in Example 1.

(3) 110 parts by weight of anhydrous caldium chloride are mixed with water and in this solution are dissolved at a warm temperature 260 parts by weight of a chromium oxy-chloride which is difficultly soluble in water. Then this solution is dried on drums. The greenish powder obtained is easily soluble in water and yields excellent, almost white leathers which are fast to boiling.

(4) 412 parts by weight of 100% chromium hydroxide are mixed with 750 parts by weight of zinc sulphate in 2000 parts of water and 1110 parts by weight of 1.23 sp. gr. sulphuric acid are allowed to run in with stirring at 90° C. The clear solution obtained is freed from the greater part of water by evaporation in a vacuum. The solid product obtained can be used for tanning by the usual methods. Leathers of great fullness and soft to the touch are obtained.

(5) 400 parts by weight of chromium hydroxide and 380 parts by weight of aluminium sulphate are dissolved in 1500 parts of water and 950 parts by weight of 1.23 sp. gr. sulphuric acid. By drying, a bright green powder of very good solubility and quick tanning action is obtained.

(6) 1000 parts by weight of pickled hides are treated for an hour in a fulling vat comprising 59 parts by weight of chromium sulphate, 52 parts by weight of magnesium sulphate in 1500 parts of water and a soda solution containing 22.5 parts by weight of calcined soda. After a further fulling of three hours, a soft, plump, fine grained leather is obtained.

In the appended claims, by the term "alkaline earth metals" are meant calcium, strontium, barium, magnesium and zinc.

We claim:

1. A new composition of matter comprising a chromium salt having a basicity of at least 33⅓%, and a water-soluble salt of an alkaline earth metal, said composition of matter being an excellent chromium tanning agent easily soluble in water.

2. A new composition of matter comprising a chromium salt having a basicity of 33⅓-50% and a water-soluble salt of an alkaline earth metal, said composition of matter being an excellent chromium tanning agent easily soluble in water.

3. A new composition of matter comprising a chromium sulfate having a basicity of at least 33⅓% and magnesium sulfate, said composition of matter being an excellent chromium tanning agent easily soluble in water.

4. A new composition of matter comprising a chromium sulfate having a basicity of 33⅓-50% and magnesium sulfate, said composition of matter being an excellent chromium tanning agent easily soluble in water.

5. A new composition of matter comprising a chromium sulfate having a basicity of 50% and magnesium sulfate, said composition of matter being an excellent chromium tanning agent easily soluble in water.

In testimony whereof, we affix our signatures.

GEORG KRÄNZLEIN.
ARTHUR VOSS.
FRANZ BRUNNTRÄGER.